Jan. 9, 1923.
F. L. O. WADSWORTH.
BEARING.
FILED JUNE 29, 1918.

INVENTOR
F.L.O. Wadsworth
BY
Marshall & Dearborn
ATTORNEYS

Patented Jan. 9, 1923.

1,441,614

UNITED STATES PATENT OFFICE.

FRANK L. O. WADSWORTH, OF PITTSBURGH, PENNSYLVANIA, ASSIGNOR TO ALBERT KINGSBURY, OF PITTSBURGH, PENNSYLVANIA.

BEARING.

Application filed June 29, 1918. Serial No. 242,535.

*To all whom it may concern:*

Be it known that I, FRANK L. O. WADSWORTH, a citizen of the United States of America, and a resident of Pittsburgh, Allegheny County, and State of Pennsylvania, have invented certain new and useful Improvements in Bearings, of which the following is a specification, reference being had to the accompanying drawings, forming a part thereof.

My invention relates to bearings and particularly to thrust bearings such as the Kingsbury type, in which oil films are automatically established and maintained when the bearing is operating by the tilting of the bearing segments, or flexibly connected segmental bearing portions of an annular bearing member or series of members, in response to the wedging action of the oil.

One object of my invention is to provide, in bearings of this character, simple and effective means for enabling the bearing to make an easy start even though it is started under load.

As is well known thrust bearings of the Kingsbury type have an exceedingly low kinetic coefficient of friction, due to the fact that the relatively moving thrust bearing surfaces are everywhere separated by, and "floated" on, wedge-shaped oil films that are automatically established and maintained by the relative sliding or surface movements of the cooperating thrust supporting faces in the plane of bearing engagement and the conjoint and coacting tilting movements of the segmental bearing members. This formation of the circumferentially disposed wedge-shaped oil films is effected by the longitudinal or tangential flexing or rocking of the segments; while said segments are also capable of transverse or radial flexing or yielding to preserve the essential relation between the thickness of the film and the varying linear speed of surface movement at the inner and outer edges or zones of bearing engagement—as viewed along radial lines or in radial sections—even when one or both of the bearing members are altered in form either by unequal or unsymmetrical wear, or by reason of distortion due to unequal heating or to varying strains set up by centrifugal action at different speeds.

The conditions established in the operation of bearings of this type are far more favorable to long continued service under heavy loads than can be obtained by the use of any form of ball or roller bearing construction. But all surface thrust bearings—whether of the so-called continuous ring type or of the Kingsbury flexible shoe type—are subject to the disadvantage that they present a relatively high static coefficient of friction; and therefore offer very considerable resistance to the initial movement from the position of rest—in other words they "start hard" as it is termed—and this relatively high frictional resistance to movement continues until the speed is sufficient to carry the oil under the advancing edges of the bearing segments and tilt them sufficiently to initiate the formation of the wedge-shaped oil films. This frequently requires considerable time; as the desired tilting movements of the bearing segments or shoes are resisted, to a greater or less degree, both by the load on the bearing surfaces—which tends, of course, to press those surfaces into parallelism with each other—and by the fact that the surfaces of the shoes must, in usual constructions, move in a direction opposite to that in which the coacting bearing member tends to move them in order to obtain the desired oil films by circumferential tilting of those members.

It is the object of this invention to eliminate the above described objection to bearings of the flexible shoe or tiltable segment type by providing ball or roller bearing members which act in combination with the surface bearing members to relieve the latter of either the whole, or a very substantial part, of the load when the bearing is at rest, and then, as soon as the parts have attained their normal speed of rotative movement, the segmental bearing members act in such manner as to relieve the rolling bearing members of substantially all thrust pressures. Thus in starting from rest the frictional resistance to movement is only that of the ball or roller bearing elements of the combination, and the shoes or segmental surface bearing members are left free to tilt readily into the necessary position for forming the wedge-shaped fluid "flotation" films; and under operating conditions the balls or rollers are relieved of the excessive localized point or line stresses and strains— and the consequent rapid deterioration or wear—to which all rolling bearings are subject when called upon to carry heavy loads.

In order that my invention may be thoroughly understood I will now proceed to describe the same in the following specification and will then point out the novel features thereof in appended claims.

The invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

Referring to the drawings:

Figure 7 is a sectional plan view on the line 7—7 of Figure 6.

Figure 8 is a partially sectional elevation showing in detail the support for the race ring which forms a part of the same bearing.

The interlocking shoe structure is shown in section in Figure 9.

Figure 10 is a sectional plan view showing a slightly modified arrangement, drawn to a smaller scale.

Another slight modification of the same structure is shown in Figure 11.

Figure 19 is a sectional plan view of the same bearing with certain of the shoes broken away or removed to disclose the rollers on which they are mounted.

Figure 20 is a circumferential section on the line 20—20 of Figure 18, and developed into a single plane.

A sectional detail of the same structure is shown in Figure 21.

Figure 22 is a view corresponding to Figure 20 of a slightly modified structure which also embodies my invention.

Still another embodiment of my invention is shown in Figures 23 and 24 which are sectional elevations taken at right angles to each other, the section of Figure 23 being furthermore developed into a single plane.

Figure 1:
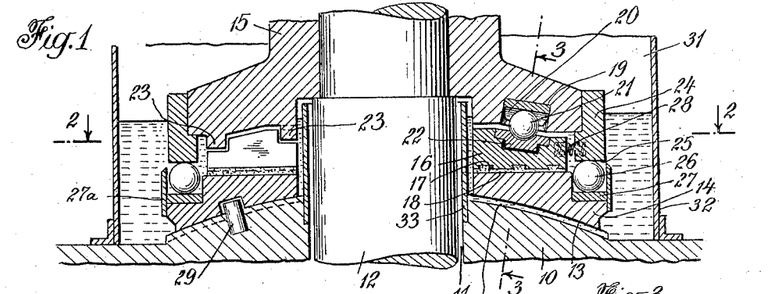
Figure 1 is a sectional elevation of a thrust bearing provided with rolling bearing members for starting, and constituting a simple embodiment of my invention.
Figures 2, 3, 4, 5:
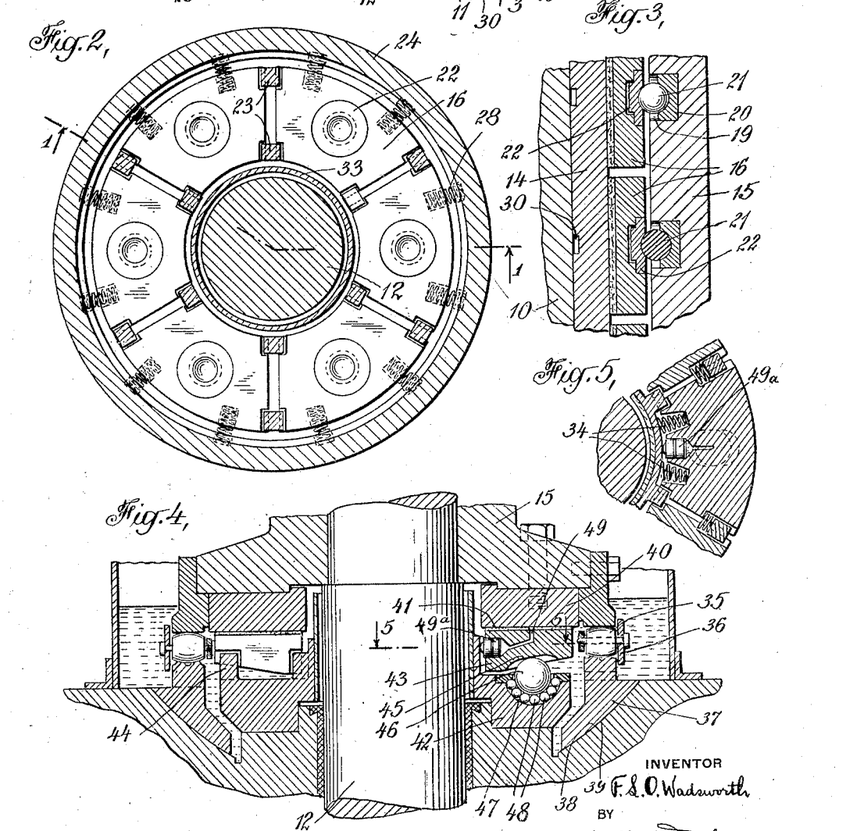
Figure 2 is a sectional plan view of the same bearing taken on the line 2—2 of Figure 1.
Figure 3 is a circumferential section on the line 3—3 of Figure 1, developed into a single plane.
Figure 4 is a sectional elevation, corresponding to Figure 1, of a modified structure which also embodies my invention and in which the pressure in the oil film is depended upon for transferring the load from the starting roller bearing members to the surface bearing members under normal operating conditions.
Figure 5 shows a portion of the same bearing in sectional plan, the view being taken on the line 5—5 of Figure 4.

In the form shown in Figures 1 to 3 inclusive, the foundation or base 10 has a central opening 11 through which a shaft 12 extends and has a spherically curved supporting surface 13 on which a relatively stationary bearing ring 14 is mounted. A thrust block 15 is secured to the shaft and a plurality of bearing shoes 16 are pivotally or tiltably mounted on the thrust block 15 and have thrust surfaces 17 which cooperate with the thrust bearing surface 18 of the bearing ring 14.

The thrust block 15 has recesses 19 into which are set hardened steel or other suitable blocks 20. These blocks form inclined cylindrical seats for ball pivots 21 on which the shoes 16 are mounted, the latter being provided with hardened inserts 22 which are spherically recessed to cooperate with the balls 21.

The arrangement of parts is such that the thrust pressure tends to force the shoes inward due to the inclination of the cylindrical seats 20, and this tendency is opposed when the bearing is operating at normal speeds by the action of centrifugal force on the shoes.

The proper relation between the shoes is maintained, and the shoes are caused to rotate with the thrust block, by lugs or projections 23 which extend from the thrust block between the shoes as shown at the left of Figure 1, and as clearly shown in Figure 2.

The thrust block 15 has a flange or collar 24, which overhangs the shoes 16 and has an annular race surface 25 with which a plurality of bearing balls 26 cooperate. The latter are mounted on a race 27 provided on the ring 14 and are held in place by the annular guard ring 27ª that is secured to said ring at its outer edge.

A plurality of springs 28 are interposed between the collar 24 and each of the shoes 16, so that they tend to force the shoes inwardly in opposition to centrifugal force. The shoes are thus always held yieldingly in place with the result that the load is equalized on the several shoes. This feature is involved in the subject matter of my copending application Serial No. 237,740 my present invention being particularly concerned with the starting of the bearing on rolling bearing members and the transfer of load therefrom to the shoes when the bearing is operating at normal speed.

The ring 14 is prevented from rotation by a loosely-engaging dowel pin 29 and the spherical surface 13 is provided with radial grooves 30 which establish oil passages between the outer and inner portions of the oil chamber 31 which is constituted in the usual manner by an outer wall or housing 32 and by an inner sleeve 33 which surrounds the shaft and is secured to the base.

When the bearing is at rest the load is largely borne by the bearing balls 26, the shoes being pressed into light engagement with the bearing surface 18 by the action of gravity thereon. The starting friction is therefore very low, being substantially that of the ball bearings. Automatic oil films are however very quickly and easily formed when the bearing starts to move and as soon as the bearing is operating at normal speed centrifugal force, acting on the rotating shoes, moves the shoes radially outward in opposition to the springs 28 so as to cause the load to be largely transferred from the ball bearings to the shoes, owing to the axial component of movement effected by the relative inclination between the bearing shoes and the thrust collar.

As long as the shoes continue to function in their usual manner, the oil films being maintained at the shoes, the operating friction of the bearing even under very heavy loads and high speeds is extremely low and the bearing balls are relieved from the wear to which they would be subject if they were used continuously to carry the load.

When the bearing is slowed down the action of centrifugal force on the shoes is correspondingly diminished and the thrust pressure forces the shoes inwardly until the weight is largely returned to the rolling bearings.

In the arrangement just described, the centrifugal action of the rotatable member, exerted directly on the shoes, is relied upon to transfer the load from the balls to the shoes, but in the arrangement of Figures 4 and 5 the transfer is accomplished in another way.

In the form here shown the rolling bearing members, which in this case have the form of rollers 35, are maintained in a predetermined relation by a roller cage 36 and are mounted on an independent ring 37 which has a ball and socket support, being provided with a spherically curved surface 38 which cooperates with a spherically curved surface 39 of the base.

The thrust block 15 in this structure is provided with a thrust collar 40 which is continuous and provided with an annular bearing surface 41. The base comprises a stationary ring member 42 on which a plurality of bearing shoes 43 are tiltably mounted. The ring member has lugs 44 which extend between the shoes and prevent their rotation. The bottom surface of each shoe has an inclined cylindrical groove 45 which cooperates with a ball support 46, the ring member 42 being provided with spherical pockets 47 in which the balls 46 are mounted, a large number or a nest of small bearing balls 48 being preferably interposed to permit the large ball to roll easily in any direction. The ball supports of both this structure and that of the previous figures provide not only for the tangential tilting of the shoes to establish oil films but also for the radial tilting of each shoe such as is necessary to equalize the pressure on all parts of its bearing surface.

When the bearing is set in operation the shoes 43 are at first subjected only to the relatively light pressures produced by comparatively weak springs 34 (see Figure 5) and are therefore easily tilted into proper position to initiate the formation of the supporting oil films. As these form, the fluid pressure in each film gradually increases and this pressure is communicated through an oil duct 49 to the back of a small piston member 49ª and forces it outwardly against a fixed stop on the base ring 42, after which the further increase in pressure reacts on the shoe and pushes it outwardly, thereby lifting the rotor member, owing to the relative inclination between the shoes and their ball supports, and relieving the roller elements 35 of all load. The thrust pressures are thus carried on and by the wedge-shaped oil films between the surface bearing members when the bearing is operating under normal conditions. This structure has the great advantage of returning the load to the rolling bearings immediately upon the failure or disruption of the oil film for any cause, such as the loss of oil from the reservoir, without being dependent upon any change in the operating speed of the bearing.

In the form shown in Figures 6 to 9 the thrust block 15 is provided with a thrust collar 40 which corresponds to that of Figure 4 and the shaft is surrounded by a sleeve 33 which cooperates with a housing wall 32 to provide an oil reservoir as in the Figure 1 construction. A ring 50 is rotatively mounted at the upper edge of the sleeve 33 and is operatively connected to the thrust collar 40 by a loosely-engaging radial dowel pin 51. The ring 50 extends downwardly and carries a series of turbine blades 52 near its lower edge and opposite the bearing surfaces.

Figure 6:
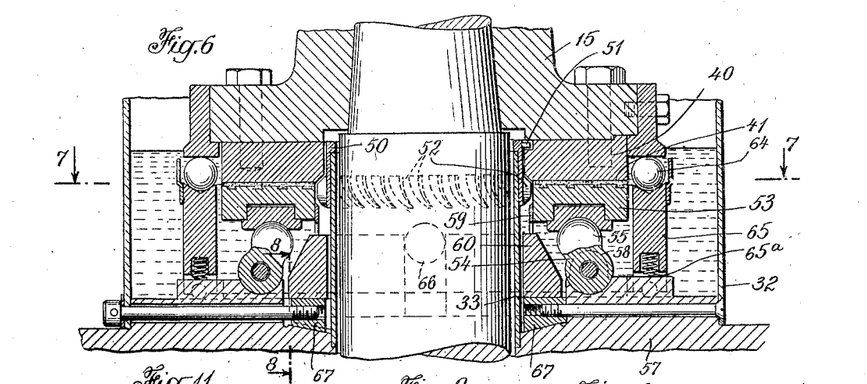
Figure 6 is a sectional elevation of another embodiment of my invention, the load transfer being effected in this case by a fluid action, due to the rotation of the movable parts of the bearing in an oil bath.

The thrust surface 41 of the collar 40 is engaged by a plurality of bearing shoes 53 which are tiltably mounted on the spherical outer ends 55 of inclined rockers 54. As clearly shown in Figure 7, the rockers have trunnion projections 56 and are tiltably mounted in perforated lugs 58 on the base 57, their axes being tangentially disposed to the shaft. The arrangement of parts is such that the thrust pressure tends to move the shoes radially inward due to the inclination of the rockers 54.

Figures 7, 8, 9, 10, 11:
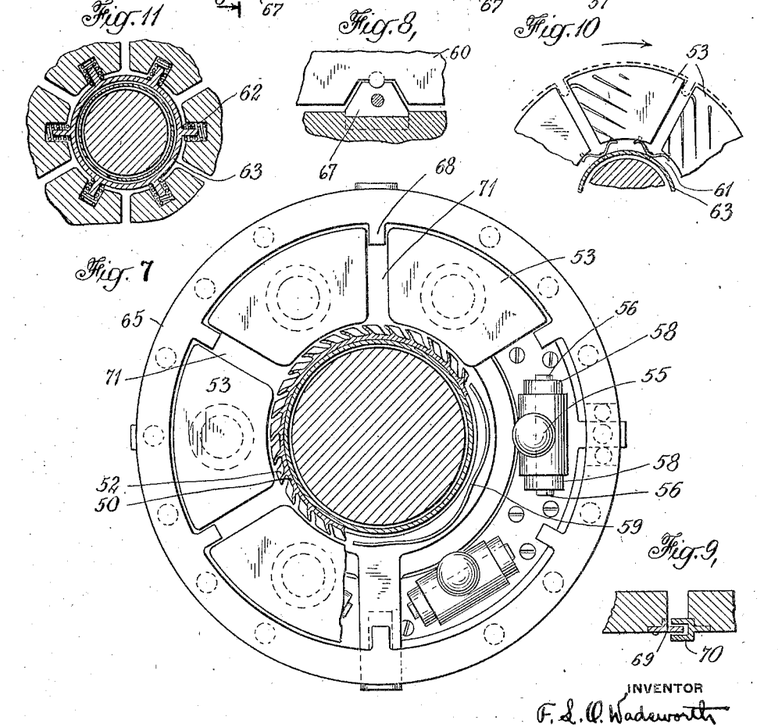

This tendency is opposed by a spring band 59 which is mounted on an inner ring 60 and is of wave-like form as clearly shown in Figure 7. This band presses the shoes outwardly and holds them in engagement with the bearing surface 41, and may be replaced by any other suitable yielding means such as the leaf springs 61 of Figure 10 or the coil springs 62 of Figure 11. In case independent springs are used they preferably react on a spring equalizing ring 63.

The spring 59 or the springs 61 and 62 are only adapted to support a portion of the load, and the balance of the load, when the bearing is at rest, is borne by a plurality of rolling bearing members 64, which are mounted on a race ring 65, and are particularly adapted to take a large proportion of the end thrust when the bearing is at rest and when it is starting.

In order to equalize the pressure on the rolling bearing members 64 the ring 65 is provided with trunnions 66 and is tiltably mounted on the inner ring 60, which is in turn pivotally mounted on the radially adjustable blocks 67, 67 (see Figs. 6 and 8) the pivotal axis of the inner ring 60 being at right angles to that of the race ring 65.

The radial spaces 71 between the contiguous edges of adjacent shoes are partially closed at their outer ends by the spacing lugs or projections 68 of the race ring 65, and at their lower sides by the loosely interlocking members 69—70 which are secured to the shoes as clearly shown in Figure 9.

The turbine blades 52 on the rotatable ring 50 are so shaped and disposed that when the bearing rotates in a clockwise direction as viewed in Figure 7, these blades scoop up the oil in which the bearing members are immersed and force it outwardly into the partially closed passages between the edges of the bearing shoes. The pressure thus set up in these spaces tends to force the shoes 53 radially outward, and consequently—by reason of the inward inclination of the rockers—lift the rotatable thrust collar and relieve the rolling bearing members 64 of a large proportion, or all, of the load which they sustain when the bearing is at rest.

Thus when the bearing is running at normal speed the cooperative and combined lifting effects on the thrust collar—due in part to the outward and upward movements of the shoes under the joint pressures of the springs 59 and of the oil forced into the spaces between the shoes by the turbine blade 52; and in part to the tilting of the bearing segments and the building up of the wedge-shaped oil films between the engaging surfaces—is sufficient to relieve the ball bearing elements of substantially all load and consequently of all rolling movement.

The proper relationship of the parts for the attainment of these results is insured by the universal or gimbal joint support for the race ring 65 which can be vertically adjusted by the radial movement of the blocks 67, and is also flexibly supported in part by the springs 65ª.

Figure 12:
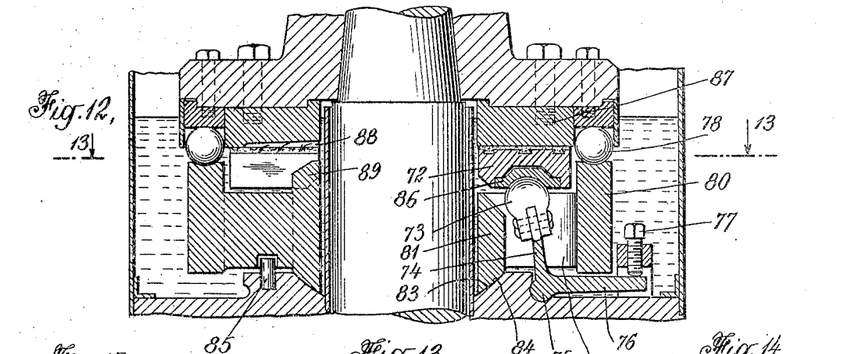
Figure 12 is a sectional elevation of a bearing which also constitutes an embodiment of my invention and which is designed to operate equally well in either direction of bearing rotation.
Figures 13, 14, 15:
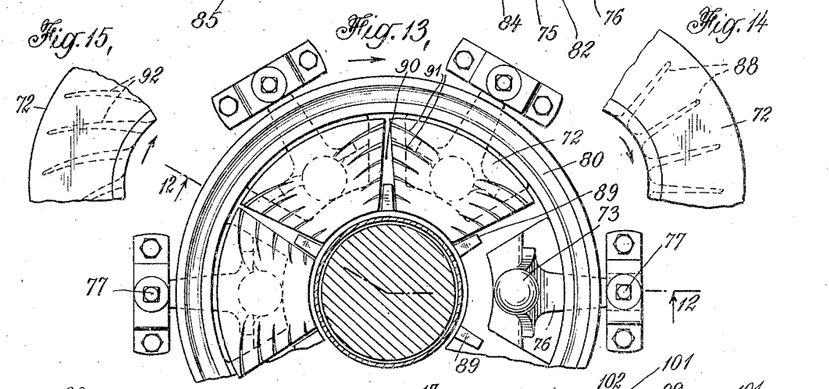
Figure 13 is a sectional plan view of the same bearing taken on the line 13—13 of Figure 12.
Figure 14 shows the formation of the rotatable bearing element.
Figure 15 is a view, corresponding to Figure 14, of a slightly modified arrangement which is preferable when the bearing is intended to operate in only one direction of rotation.

The structure above described is adapted to operate only in one direction, but the modified structure shown in Figures 12, 13 and 14 is adapted to operate in either direction with equal facility. In the form here shown each tiltable bearing shoe 72 is mounted on a spherical end or extension 73 of a flexible arm 74 which constitutes the inner member of a bell crank lever which is pivoted at 75 and has an outwardly extending rigid arm 76.

The resilient arm 74 is sligthly inclined towards the axis of the bearing so that it tends to move the shoes radially outward; and the thrust pressure has a component which tends to flex the arm and force the spherical supports 73 radially inward.

The rigid arm 76 of each lever is limited in its upward movement by an adjusting screw 77 which constitutes a means for independently adjusting the position of each shoe and thus equalizing the pressure on the different segmental bearing surfaces.

The resiliency of the lever, and the adjustment of the parts, is such that only a small proportion of the thrust load is carried by the shoes when the bearing is at rest; the balance of the load being, at that time, carried by the bearing balls 78 which are mounted on a ball race 80 that forms the rim of a wheel-shaped structure or spider having a hub 81 and a plurality of radial spokes or webs 82. The hub 81 forms a ball and socket joint with the base, being provided with spherical surface 83 which cooperates with the correspondingly curved surface 84 of the base. Each rigid lever arm 76 is substantially horizontal, and is located below the rim 80, and each flexible arm 74 extends between the spokes 82 of the spider so that the mounting of the shoes is independent of and does not interfere with the mounting of the ball race. The pressure is equally distributed among the several balls by the ball and socket joint above described. The spider is prevented from rotation by a loosely-engaging dowel pin 85 which extends upwardly from the base as clearly shown in Figure 12.

Each shoe is preferably provided with a hardened insert 86 which is formed into a socket to cooperate with the spherical end 73 of the lever 74.

The rotatable thrust collar 87, which corresponds to the collar 40 in the previous figures, is in this structure provided with radial pocket grooves 88 as clearly shown in Figure 14. The bearing shoes are prevented from rotating and their relative position maintained by outwardly extending lugs 89 on the spider hub 81. They are so shaped—their edges being slightly inclined to the radius—that their outer corners are close together and the spaces between them are tapered, as clearly shown in Figure 13.

When the bearing is in operation the oil is drawn into the pockets 88 of the rotating thrust collar, is discharged therefrom into the spaces 90 between the shoes, and exerts a pressure on the edges of the bearing segments which tends to move them radially outward, which movement is aided by the resiliency of the arms 74. This movement is sufficient, when the bearing is operating at normal speed, to relieve the ball bearings of practically all load. The wedging action of the oil upon the shoes—which tends to tilt them circumferentially—may be enhanced by providing the top surface of the shoes with inwardly inclined slots or grooves 91 as shown in Figure 13, but these are not essential.

As in the structures previously described, the shoes are pressed lightly against the cooperating surface of the thrust collar 87 when the bearing is at rest by the action of the resilient arms 74; and since the proportion of the load which they then support is small, the shoes readily assume the tilted positions which are essential to automatically establish and maintain the desired wedge-shaped oil films between the bearing surfaces.

If the structure of Figures 12 and 13 is to operate always in the same direction the radially disposed pocket grooves 88 are preferably replaced by inclined pocket grooves 92 as shown in Figure 15, the direction of rotation being indicated by the arrow.

Figures 16, 17:
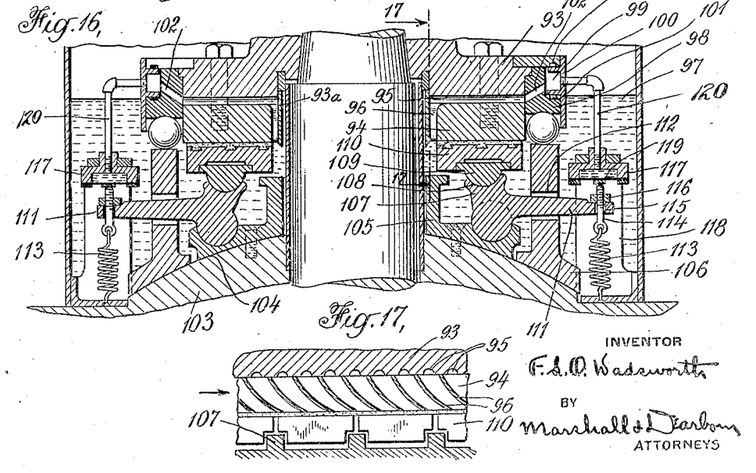
Figure 16 is a view, corresponding to Figure 12, of another construction which constitutes an embodiment of my invention.
Figure 17 is a sectional elevation taken on the line 17—17 of Figure 16.

In the form shown in Figures 16 and 17, the structure comprises a thrust block 93 to which a thrust collar 94 is secured. The thrust block is provided with radial passages 95, as clearly shown in Figure 17, and also carries a ring 93$^a$ which is provided with turbine blades 96 that are adapted to scoop up the oil contained in the reservoir 97 and deliver it to the radial passages 95.

A race ring 98 is attached to the thrust block and has an annular channel 99 into which a relatively stationary channel-shaped collector 100 is fitted, packing rings 101 being provided to prevent leakage at the joints between the stationary and movable members. The annular chamber 99 is connected to the radial passages 95 at their outer ends by passages 102; the arrangement of parts being such that when the bearing is in operation the joint action of the turbine blades 96 and the radial passages 95 and 102 fills the annular chamber with oil under pressure.

The stationary member of the bearing comprises a foundation 103 having a spherically curved supporting surface 104 on which a base ring 105 and a race ring 106 are independently mounted, each of these parts being provided with a correspondingly curved bottom surface to cooperate with the surface 104. Pivotally mounted on the ring 105 are a plurality of bell crank levers 107 each of which has an upwardly extending inwardly inclined arm which is provided, at its upper end, with a socket 108, that cooperates with a ball projection 109 on the bottom of each of a series of bearing shoes 110. Each of the bell crank levers is also provided with an outwardly projecting arm 111 which extends loosely through an opening 112 in the race ring 106 and is drawn downwardly by a spring 113. In order to adjust the tension of the spring an eye-bolt 114 is secured to its outer end, extends through a suitable hole 115 in the bell crank arm, and has an adjusting nut 116 screwed on its upper end as clearly shown in Figure 16.

A plurality of fluid boxes 117 are supported on a stationary bracket 118 and each is provided with a diaphragm 119 which is in position to cooperate with the upper end of the screw 114. Each fluid box is connected by a pipe 120 to the annular fluid chamber 99.

There is a diaphragm for each of the arms and the arrangement of parts is such that the end thrust pressure tends to force the bearing shoes radially inward, and raise the outwardly extending arms of the bell crank levers in opposition to the tension of the springs 113 and the cooperating pressure on the diaphragms 119.

A plurality of bearing balls 121 are interposed between the race ring 98 and the race ring 106 and the parts are so arranged that when the bearing is at rest a large proportion of the thrust load is carried by these balls and only a small proportion of the said load is carried by the springs 113 and the diaphragms 119—this proportion being determined by the adjustment of the spring tensions by the nuts 116. Under these conditions the shoes are lightly pressed into engagement with the bearing surface 122 of the thrust collar 94, and are free to tilt both tangentially and radially so that they can quickly assume the best position to establish and maintain the desired oil films between the bearing surfaces. When the bearing rotates at normal speed the oil pressure produced in the chamber 99 is transmitted through the pipes 120 to the fluid boxes 117 and acts through the diaphragms 119 to push downwardly on the bolts 114 and on the lever arms 111. The bearing shoes 110 are thus elevated, as well as moved radially outward, and the load is transferred from the bearing balls to the shoes.

It is thus apparent that this structure as well as those already described has the advantage of starting easily combined with the efficient and economical operation which characterizes the Kingsbury shoe bearings.

In the form shown in Figures 18 to 21 inclusive, the rotatable member of the bearing is similar to that of Figure 4 and comprises the shaft 12 having a thrust block 15, to which a thrust collar 40 is attached. The base is designated 123 and has a beveled or inclined annular surface 124 in which are a plurality of shallow radial grooves or depressions 125. Within this annular surface there is a concave spherical surface 126 on which a race ring 127 is seated. The latter is prevented from rotation by a loosely-engaging dowel pin 128 and has an annular groove 129 at the top in which bearing balls 130 are mounted. A sleeve 131 is attached to the race ring 127 and forms the inner wall of the usual annular oil reservoir 132 which is completed by the outer housing wall 32.

Figure 18:
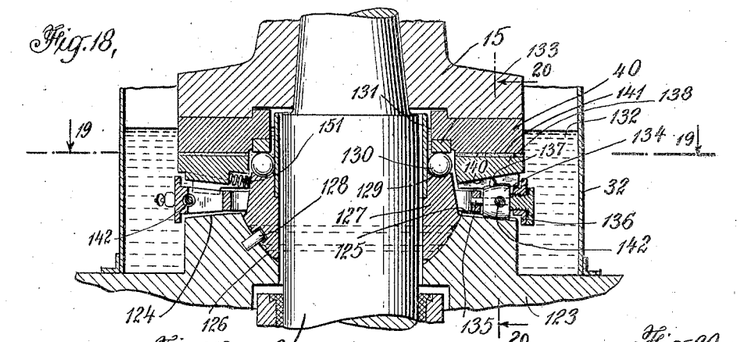
Figure 18 is a sectional elevation of a combined roller and shoe thrust bearing in which the bearing shoes are mounted on spaced rollers arranged in such manner that the shoes readily assume their tilted positions when the bearing starts and such that the load is transferred to them when the bearing is in operation.

The collar 40 has preferably a hardened race ring 133 at its inner edge which cooperates with the bearing balls 130. The spherical surface 126 forms a ball and socket joint between the race ring 127 and the base so that the pressure sustained by the bearing balls is equally distributed among them.

Figures 19, 20, 21, 22, 23, 24:
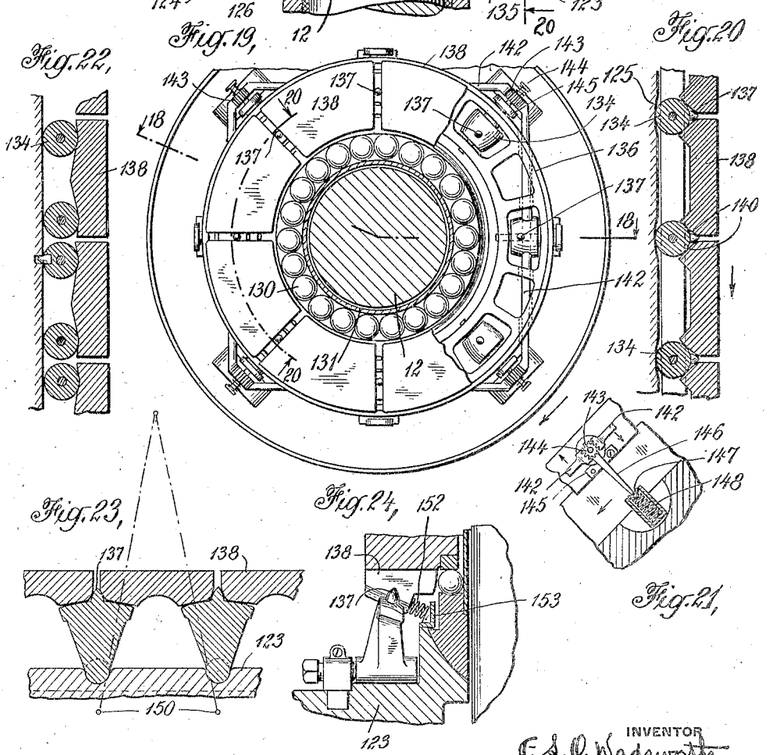

Mounted on the surface 124 of the base and centered in the grooves 125 are a plurality of circumferentially distributed rollers 134 which are mounted on radial pins 135 in a roller cage 136; and each roller is preferably provided with a lug or projection 137 which has the form of a tooth and extends between the bearing shoes 138 which are mounted on the rollers.

The shoes have beveled and inclined surfaces 140 which are adapted to cooperate with the rollers, each shoe being supported on a pair of adjacent rollers as clearly shown in Figure 20. The proper relation between shoes is maintained by the toothed projections 137.

The arrangement of parts is such that when the rollers are centered as shown in Figure 20 and the bearing surfaces of the shoes lie in a single plane, the load is largely borne by the bearing balls 130. Nevertheless the bearing shoes are in position to contact lightly with the annular bearing surface 141 of the thrust collar 40.

When the bearing is started the friction between the shoes and the surface 141 causes the shoes to move circumferentially and in so doing the rollers 134 are turned so that the leading end of each shoe is lowered while its trailing end is elevated.

Thus the shoes are tilted into positions necessary to establish and maintain oil films between the surfaces. The action of the oil alone tends to tilt the shoes but in this case the shoes are mounted so that they are also tilted in the desired direction by reason of their circumferential movement.

This tilting movement and the automatic establishment of the oil films obviously tends to lift the thrust collar and thus increase the proportion of the load borne by the shoes; and if the parts are very carefully adjusted this action alone may be sufficient to relieve the ball bearings from all thrust pressure at normal speeds. However, when the base is provided with grooves or depressions 125 as shown, the movement of the rollers on the base obviously tends to further elevate the shoe system as a whole, and thus ensure the transference of the entire load to the surface bearing elements of the structure.

The tooth projections 137 insure the proper conjoint and cooperative movement of the shoes and their roller supports but as a further means for obtaining the simultaneous movement of the different roller elements, I may provide each alternate roller with two oppositely extending radial arms 142 having teeth at their ends and connect the adjacent ends of each pair of arms by means of a bevel pinion 143 which is in mesh with said teeth and mounted to revolve freely on a pin 144 projecting from the support 145 of the intermediate roller, as clearly shown in Figures 19 and 21. Furthermore, each pinion may be provided with a finger 146 which is engaged at its outer end by a spring-pressed pawl 147 that slides in a pivotal socket 148. When the bearing revolves in a clockwise direction as indicated by the arrows in Figures 19, 20 and 21, the roller members 134 all roll in a counter-clockwise direction—looking toward the axis of the bearing—and the bevel pinions 143 are revolved in a clockwise direction, thereby moving the lower ends of the fingers 146 to the left and tilting the springs and pivoted sockets in the direction of the arrow shown in Figure 21.

This movement permits each spring to expand and assists the frictional action of the thrust collar in carrying the series of roller supported shoes forwardly and upwardly and also in preventing any recoil or rebound of the series to the central position, such as might be caused by a sudden diminution in the frictional drag on the shoes, or by other abnormal fluctuation in the operation of the bearing.

Instead of forming grooves or depressions in the base on which the rollers 134 are mounted, the under surfaces of the shoes may be provided with shallow grooves or depressions such as shown in Figure 22. The result of the circumferential movement of the series of shoes will be the same as in the construction above described.

The rollers obviously move through a comparatively small angle and they may be replaced by rockers such as are shown in Figures 23 and 24. The lifting action on the shoes is secured, in this case, by locating the centers of curvature 150 of the rocker surfaces below the points of pivotal support for these members.

The supporting surfaces of the rollers, and also of the rockers, are tapering or frusto-conical or axially curved in form and co-operate with radially inclined, as well as beveled, surfaces on the bottom of the shoes, whence the tendency of the thrust pressures is to move the shoes radially inward, and this tendency is overcome in the structures of Figures 18 to 21 by the springs 151, and in the embodiment of Figures 23 and 24 by the springs 152. The springs 152 react on a spring equalizer ring 153, and the arrangement of parts is such that the thrust pressure is equitably and automatically distributed over the entire system of segmental bearing surfaces. The formation of the surfaces of both the rollers and the rockers is also such as to permit the shoes to rock radially thereon, so as to insure the equitable distribution of pressure over all parts of the bearing surfaces of each of the individual shoes.

Structures of preferred form and construction have been illustrated and described for the purpose of showing ways in which this invention may be embodied, but the inventive thought upon which this application is based is broader than these illustrative embodiments thereof, and I therefore intend no limitations other than those imposed by the appended claims.

What I claim is:

1. In a thrust bearing, the combination of surface bearing members, rolling bearing members, and means cooperating with said surface bearing members whereby the latter are operated when the bearing is in operation to transfer the thrust from the rolling bearing members to the surface bearing members.

2. In a thrust bearing, the combination of a plurality of tiltable bearing members, rolling bearing members, and means actuated by centrifugal force when the bearing is in operation whereby said tiltable bearing members are operated to transfer load from the rolling bearing members to the tiltable bearing members.

3. In a thrust bearing, the combination of tiltable bearing members and rolling bearing members, said tiltable bearing members being movable in response to centrifugal force when the bearing is in operation to take the load from the rolling bearing members.

4. In a thrust bearing, the combination of relatively rotatable members, tiltable bearing shoes interposed between said members, rolling bearings also interposed between said members, and means for throwing the load onto the tiltable shoes when the bearing is in operation.

5. In a thrust bearing, the combination of a rotatable thrust member, a plurality of radially movable bearing shoes mounted thereon, yielding means for pressing the shoes radially inward, the connection between each shoe and its supporting member being such that outward radial movement of the shoe forces the supporting member away from the opposed bearing member, and rolling bearings interposed between said supporting and opposed bearing members.

6. In a thrust bearing, the combination of a rotatable member, a plurality of shoes tiltable thereon and having a radial wedge relation therewith, and rolling bearings arranged to take at least a part of the thrust load when the shoes are pressed inwardly and adapted to be relieved of thrust load when the shoes are forced outwardly by centrifugal action.

7. In a thrust bearing, the combination of a rotatable member, a plurality of bearing shoes, a ball pivot for each shoe, a radially inclined surface on the rotatable member for each ball pivot, rolling bearing members in multiple relation to the shoes, and yielding means for pressing the shoes inwardly in opposition to centrifugal force.

8. In a thrust bearing, the combination of rolling bearing members, tiltable bearing members adapted to take the thrust to a greater or less degree dependent on their radial adjustment, and means dependent on the operation of the bearing for producing a radial adjustment of the tiltable bearing members.

9. In a thrust bearing, the combination of a relatively rotatable thrust member having an annular race surface, a relatively stationary race ring, a plurality of rolling bearing members mounted on the race ring and cooperating with the race surface of the rotatable member, tiltable bearing members interposed between the stationary and rotatable bearing members, and means for transferring the load from the rolling bearing members to the tiltable bearing members.

10. In a thrust bearing the combination of a relatively rotatable thrust collar having an annular race surface, a relatively stationary race ring, an equalizing support for the race ring, a plurality of rolling bearing members mounted on the race ring and cooperating with the race surface of said collar, and a surface bearing member interposed between said collar and said support.

11. In a thrust bearing, the combination of a relatively rotatable thrust collar having an annular race surface, a relatively stationary race ring, an equalizing support therefor, a plurality of rolling bearing members mounted on the race ring and cooperating with the race surface of said collar, a surface bearing member intermediate said support and said collar, and independent means for equalizing the thrust pressure on the surface bearing member.

12. In a thrust bearing, the combination of a relatively rotatable thrust member having an annular race surface, a relatively stationary race ring, an equalizing support therefor, a plurality of rolling bearing members mounted on the race ring and cooperating with the race surface of the rotatable member, tiltable bearing members intermediate said support and the rotatable member, and independent means for equalizing the pressure on the tiltable bearing members.

13. In a thrust bearing, the combination of a relatively rotatable thrust member having an annular race surface, a relatively stationary race ring, an equalizing support therefor, a plurality of rolling bearing members mounted on the race ring and cooperating with the race surface of the rotatable member, tiltable bearing members intermediate said support and the rotatable member, independent means for equalizing the pressure on the tiltable bearing members, and means for transferring load from the rolling bearing members to the tiltable bearing members.

14. In a thrust bearing, the combination of a relatively rotatable thrust member having an annular race surface, a relatively stationary race ring, a plurality of rolling bearing members mounted on the race ring and cooperating with the race surface of the rotatable member, a plurality of tiltable bearing members intermediate the stationary and rotatable bearing members, and means dependent on a radial adjustment of the tiltable bearing members for equally distributing the pressure thereon.

15. In a thrust bearing, the combination of a relatively rotatable thrust member having an annular race surface, a relatively stationary race ring, a plurality of rolling bearing members mounted on the race ring and cooperating with the race surface of the rotatable member, a plurality of tiltable bearing members intermediate the stationary and rotatable bearing members, means dependent on a radial adjustment of the tiltable bearing members for equally distributing the pressure thereon, and means for transferring the load from the rolling bearing members to the tiltable bearing members.

16. In a thrust bearing, the combination of bearing segments, rolling bearing members, and means mounting said segments whereby the same are movable to transfer a substantial part of the load to the rolling bearing members when the bearing is at rest and to assume the load when the bearing is in operation.

17. In a thrust bearing, the combination of bearing segments and rolling bearing members, said segments having movement comprising movement in an axial direction to transfer a substantial part of the load to the rolling bearing members when the bearing is at rest and to assume the load when the bearing is in operation.

18. In a thrust bearing, the combination of bearing segments and rolling bearing members, said segments being radially movable to transfer a substantial part of the load to the rolling bearing members when the bearing is at rest and to assume the load when the bearing is in operation.

19. In a thrust bearing, the combination of bearing segments and rolling bearing members, said segments being movable in response to centrifugal force to assume the load when the bearing is in operation but transferring a substantial part of the load to said rolling bearing members when the bearing is at rest.

20. In a thrust bearing, the combination of a series of tiltable bearing members, a series of rolling bearing members, and means mounting one of said series for movement when the bearing is in operation so that the rolling bearing members assume a substantial part of the load when the bearing is at rest and the tiltable bearing members assume the load when the bearing is in operation.

21. In a thrust bearing, the combination of a series of tiltable bearing members, a series of rolling bearing members, and means mounting one of said series to move in response to centrifugal force whereby the rolling bearing members assume a substantial part of the load when the bearing is at rest and the tiltable bearing members assume the load when the bearing is in operation.

22. In a thrust bearing, the combination of tiltable bearing members, rolling bearing members, and means whereby said tiltable bearing members are moved into a position to assume the load from the rolling bearing members when the bearing is in operation.

23. In a thrust bearing, the combination of tiltable bearing members, rolling bearing members, and means mounting said tiltable bearing members to move radially into a position to assume the load from the rolling bearing members when the bearing is in operation.

24. In a thrust bearing, the combination of tiltable bearing members, rolling bearing members, and means mounting said tiltable bearing members to move in response to centrifugal force into a position to assume the load from the rolling bearing members when the bearing is in operation.

25. In a thrust bearing, the combination of a series of bearing segments, a series of rolling bearing members adapted to carry a substantial part of the load when the bearing is at rest, and means operative when the bearing is in operation whereby one of said series is moved to cause the load to be transferred to said bearing segments.

26. In a thrust bearing, the combination of a series of bearing segments, a series of rolling bearing members adapted to carry a substantial part of the load when the bearing is at rest, and means whereby one of said series is moved in response to centrifugal force to cause the load to be transferred to said bearing segments when the bearing is in operation.

27. In a thrust bearing, the combination of relatively rotatable bearing members, radially movable bearing segments between said bearing members, rolling bearing members between said relatively rotatable members adapted to carry a substantial part of the load when the bearing is at rest, and means mounting said segments whereby they move axially to assume the load when they are moved radially a predetermined amount.

28. In a thrust bearing, the combination of relatively rotatable bearing members, radially movable bearing segments between said bearing members, rolling bearing members between said relatively rotatable members adapted to carry a substantial part of the load when the bearing is at rest, and means mounting said segments whereby they are moved radially to assume the load when the bearing is in operation.

29. In a thrust bearing, the combination of relatively rotatable bearing members, radially movable bearing segments between said bearing members, rolling bearing members between said relatively rotatable members adapted to carry a substantial part of the load when the bearing is at rest, and means mounting said segments whereby they are moved radially in response to centrifugal force and thereby axially to assume the load when the bearing is in operation.

30. In a thrust bearing, relatively rotatable bearing members, bearing segments between said bearing members, rolling bearing members between said relatively rotatable members adapted to assume a substantial part of the load when the bearing is at rest, and means whereby said segments are moved to assume the load when the bearing is in operation.

31. In a thrust bearing, relatively rotatable bearing members, radially movable bearing segments between said members, rolling bearing members between said first-named members adapted to assume a substantial part of the load when the bearing is at rest, and means whereby said segments are moved radially to assume the load when the bearing is in operation.

32. In a thrust bearing, relatively rotatable bearing members, radially movable bearing segments between said members, rolling bearing members between said first-named members adapted to assume a substantial part of the load when the bearing is at rest, resilient means tending to move said segments radially, and means whereby said segments are moved axially to assume the load when the bearing is in operation.

33. In a thrust bearing, relatively rotatable bearing members, radially movable bearing segments between said members, rolling bearing members between said first-named members adapted to assume a substantial part of the load when the bearing is at rest, resilient means tending to move said segments radially inward, and means whereby said segments move axially and radially outward to assume the load when the bearing is in operation.

34. In a thrust bearing, a rotatable bearing member, a plurality of bearing segments mounted thereon, rolling bearings for said member adapted to take a substantial part of the load when the bearing is at rest, and means whereby said segments are moved to assume the load when the bearing is in operation.

35. In a thrust bearing, a rotatable bearing member, a plurality of bearing segments mounted thereon, rolling bearings for said member adapted to take a substantial part of the load when the bearing is at rest, resilient means tending to move said segments radially inward, and means whereby said segments move radially outward and axially to assume the load when the bearing is in operation.

36. In a thrust bearing, a rotatable bearing member, a plurality of bearing segments mounted thereon, rolling bearings for said member adapted to take a substantial part of the load when the bearing is at rest, and means mounting said segments whereby they move in response to centrifugal force to assume the load when the bearing is in operation.

37. In a thrust bearing, a rotatable bearing member, a plurality of bearing segments mounted thereon, rolling bearings for said member adapted to take a substantial part of the load when the bearing is at rest, and means mounting said segments whereby they move radially and axially to assume the load when the bearing is in operation.

38. In a thrust bearing, a rotatable bearing member, a plurality of bearing segments, rolling bearings for said member adapted to take a substantial part of the load when the bearing is at rest, and means mounting said segments whereby they move to assume the load when the bearing is in operation and whereby they may tilt both radially and circumferentially.

39. In a thrust bearing, a rotatable bearing member, a plurality of bearing segments mounted thereon, rolling bearings for said member adapted to take a substantial part of the load when the bearing is at rest, a ball pivot for each segment, and an inclined surface on the rotatable member with which the ball cooperates and whereby radial movement of each segment is accompanied by an axial movement thereof.

40. In a thrust bearing, a rotatable bearing member, a plurality of bearing segments mounted thereon, rolling bearings for said member adapted to take a substantial part of the load when the bearing is at rest, a ball pivot for each segment, an inclined surface on the rotatable member with which the ball cooperates and whereby radial movement of the segment is accompanied by an axial movement thereof, and resilient means opposing radial movement of the segments.

41. In a thrust bearing, relatively rotatable bearing members, bearing segments therebetween, rolling bearing members between said first-named members adapted to assume a substantial part of the load when the bearing is at rest, and rolling members supporting said segments and cooperating therewith to move said segments axially to assume the load when the bearing is in operation.

42. In a thrust bearing, the combination of relatively rotatable bearing members, bearing segments therebetween, means whereby the pressure on said segments is equalized, rolling bearing members between said first-named members adapted to assume a substantial part of the load when the bearing is at rest, and means whereby said segments assume the load when the bearing is in operation.

43. In a thrust bearing, the combination of relatively rotatable bearing members, bearing segments therebetween, rolling bearing members between said first-named members adapted to assume a substantial part of the load when the bearing is at rest, and means whereby said segments assume the load when the bearing is in operation.

44. In a thrust bearing, the combination of relatively rotatable bearing members having race surfaces, rolling bearing members between said race surfaces, bearing segments between said relatively rotatable bearing members, and an equalizing support for said rolling bearing members.

45. In a thrust bearing, the combination of relatively rotatable bearing members, bearing segments between said members, ball supports for said segments, rolling bearing members between said relatively rotatable members adapted to assume a substantial part of the load when the bearing is at rest, and means whereby said segments assume the load when the bearing is in operation.

46. In a thrust bearing, a series of surface bearing members, a series of rolling bearing members, and means for moving one of said series whereby the load is transferred from one of said series to the other as the bearing varies its speed.

47. In a thrust bearing, bearing segments, rolling bearing members adapted to carry a substantial part of the load when the bearing is at rest, and means for moving said segments whereby the load is transferred to said segments when the bearing is in operation.

48. In a thrust bearing, a rotatable bearing member, a series of bearing segments mounted thereon, a series of rolling bearing members adapted to take a substantial part of the load when the bearing is at rest, and means whereby one of said series is moved when the bearing is in operation to cause the load to be assumed by said bearing segments.

49. In a thrust bearing, bearing segments, rolling bearing members adapted to carry a substantial part of the load when the bearing is at rest, and means for moving said segments whereby the pressure of said segments on the opposed bearing member is increased when the bearing is in operation.

50. In a thrust bearing, relatively rotatable bearing members, bearing segments between said members adapted to take the load when the bearing is in operation, and rolling bearing members between said first-named members adapted to take a substantial part of the load when the bearing is at rest.

51. In a thrust bearing, the combination of relatively rotatable bearing members, rolling bearing members therebetween adapted to assume a substantial part of the load when the bearing is at rest, bearing segments between said relatively rotatable members, means whereby said segments assume the load when the bearing is in operation, and an equalizing support for said rolling bearing members.

52. In a thrust bearing, the combination of relatively rotatable members, bearing segments interposed between said members, rolling bearing members between said relatively rotatable members adapted to assume a substantial part of the load when the bearing is at rest, and means for moving said segments to assume the load when the bearing is in operation.

53. In a thrust bearing, relatively rotatable bearing members including bearing segments, rolling bearing members between said first named bearing members, and means whereby said bearing segments are operated when the bearing is in operation to transfer load from said rolling members to said segments.

In witness whereof, I have hereunto set my hand this 21st day of June, 1918.

FRANK L. O. WADSWORTH.